United States Patent [19]

Paauwe et al.

[11] Patent Number: 5,660,268

[45] Date of Patent: Aug. 26, 1997

[54] POWER DRIVE UNIT FOR AIRCRAFT CARGO HANDLING SYSTEMS

[75] Inventors: Dennis J. Paauwe, Portage; Robert E. Kovacevich, Mattawan, both of Mich.

[73] Assignee: Vickers, Inc., Maumee, Ohio

[21] Appl. No.: 514,870

[22] Filed: Aug. 14, 1995

[51] Int. Cl.$^6$ .................................................. B65G 13/12
[52] U.S. Cl. .................................................. 198/782
[58] Field of Search ............................. 198/780, 782, 198/781.07, 792, 788, 789

[56] References Cited

U.S. PATENT DOCUMENTS

| | | |
|---|---|---|
| 3,698,539 | 10/1972 | Schwarzbeck . |
| 3,712,454 | 1/1973 | McKee ............................. 198/782 |
| 3,737,022 | 6/1973 | DeNeefe et al. . |
| 4,697,694 | 10/1987 | Huber . |
| 4,792,037 | 12/1988 | Huber . |
| 4,949,837 | 8/1990 | Huber . |
| 5,042,645 | 8/1991 | Pritchard . |
| 5,101,962 | 4/1992 | Pritchard . |

*Primary Examiner*—James R. Bidwell
*Attorney, Agent, or Firm*—Barnes, Kisselle, Raisch, Choate, Whittemore & Hulbert

[57] ABSTRACT

A power drive unit for aircraft cargo handling systems that includes a motor and a drive roller carried for engagement with cargo to be driven by the unit. Planetary gears rotatably couple the output shaft of the motor to an output gear coaxial with the motor output shaft. Idler gears extend laterally from the planetary output gear and rotatably couple the planetary output gear to the roller drive shaft. A pair of angularly spaced reaction gears are coupled to the planetary output gear in opposition to the idler gears for supporting the output gear against reaction forces imparted thereto by the drive roller through the idler gears.

17 Claims, 4 Drawing Sheets

POWER DRIVE UNIT FOR AIRCRAFT CARGO HANDLING SYSTEMS

The present invention is directed to aircraft cargo handling systems, and more particularly to a power drive unit for engaging and moving cargo in such systems.

BACKGROUND AND SUMMARY OF THE INVENTION

Power drive units for aircraft cargo handling systems conventionally include a drive roller coupled to an electric motor for engaging and propelling cargo along a ball or roller conveyor surface to and from storage positions within an aircraft hull. Self-erecting power drive units are particularly advantageous in many aircraft cargo handling system applications. In these units, application of electrical power to the drive motor initially operates to raise the drive roller from a lowered or retracted position beneath the conveyor surface to a raised or erected position in which the drive roller is disposed at the cargo conveyor plane for engagement with the cargo units.

In both stationary and self-erecting units, the output of the motor is conventionally coupled through planetary gear systems to an output gear coaxial with the motor, and then through idler gears to the drive roller and roller-erecting mechanism where applicable. The planetary stage output gear is conventionally supported by bearings against reaction forces applied thereto by the idler gears from the drive roller. It is a general object of the present invention to provide a power drive unit of the described character in which such output gear support bearing is eliminated, thereby resulting in a more compact construction in which the output gear stage is free-floating and self-aligning in operation. It is thus a related object of the present invention to provide a power drive unit of the described character that is more compact, reliable and rugged than are comparable units in the prior art.

A power drive unit for aircraft cargo handling systems in accordance with the present invention includes a motor and a drive roller carried for engagement with cargo to be driven by the unit. Planetary gears rotatably couple the output shaft of the motor to an output gear, which preferably is coaxial with the motor output shaft. Idler gears extend laterally from the planetary output gear and rotatably couple the planetary output gear to the roller drive shaft. One or more angularly spaced reaction gears are coupled to the planetary output gear in opposition to the idler gears for supporting the output gear against reaction forces imparted thereto by the drive roller through the idler gears.

In the disclosed embodiment of the invention, the reaction gear or gears comprise idler gears mounted on associated adjustable eccentric shafts. The eccentric shafts have screwdriver slots or other suitable means at one end, and are held in adjusted position by set screws threadably received in the unit housing. It would be preferable, for reasons of cost, to eliminate the need for gear and shaft adjustment. The roller output shaft in the preferred embodiment of the invention is mounted for rotation in stationary position within the unit housing. The roller drive shaft is coupled by gears to the surrounding drive roller in such a way that the drive roller orbits around the drive shaft. Locators extend from the drive roller and are received in arcuate slots in the unit housing. In this way, initial energization of the drive unit motor operates through the roller drive shaft and gears to raise the roller into a cargo-engaging position, with motion thereof being guided by the locators received in the arcuate slots. Further rotation of the drive motor functions to hold the roller in the raised position while rotating the roller about its axis.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 5:
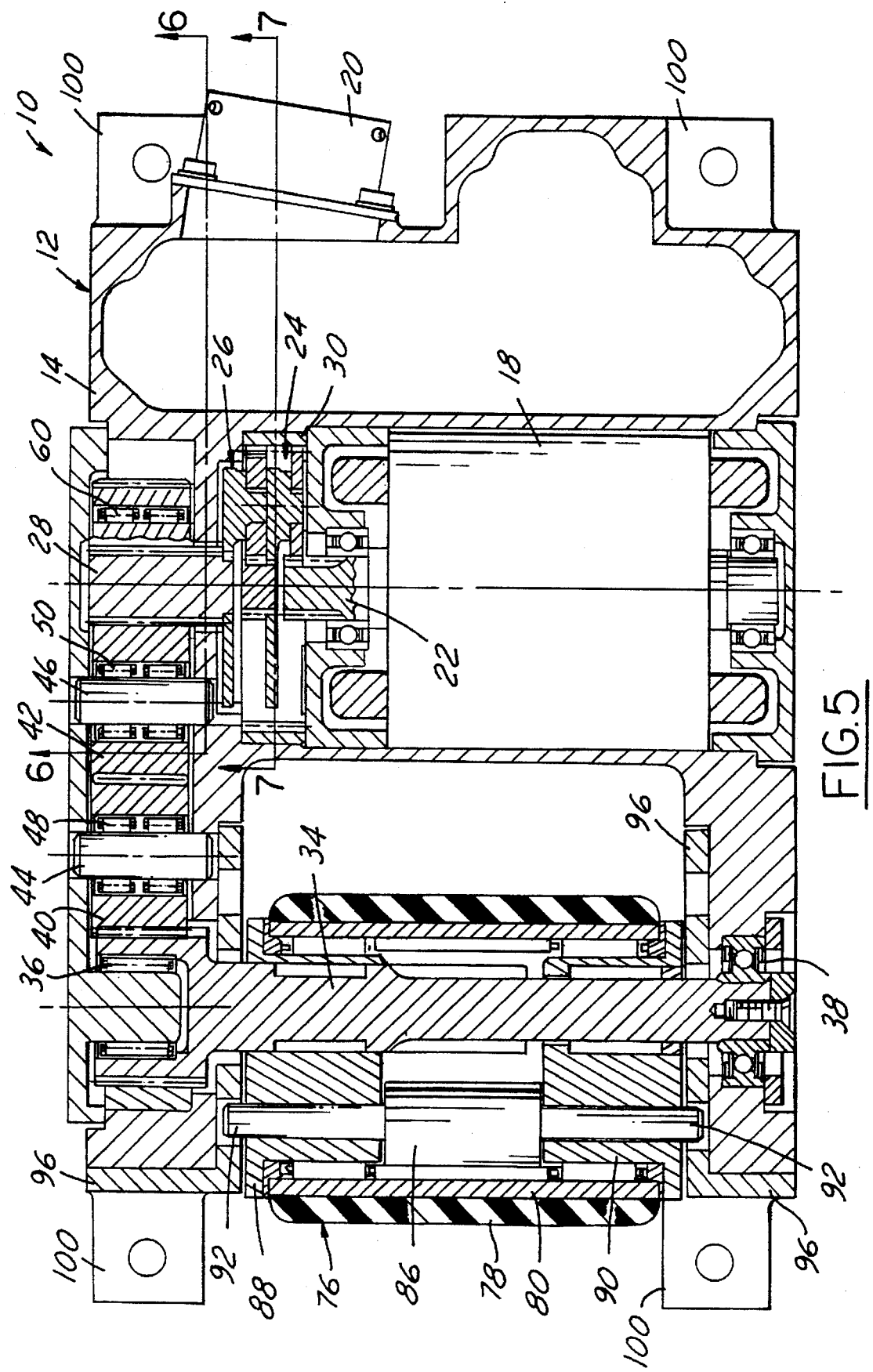
FIG. 5 is a sectional view taken substantially along the line 5—5 in FIG. 2.
Figure 7:
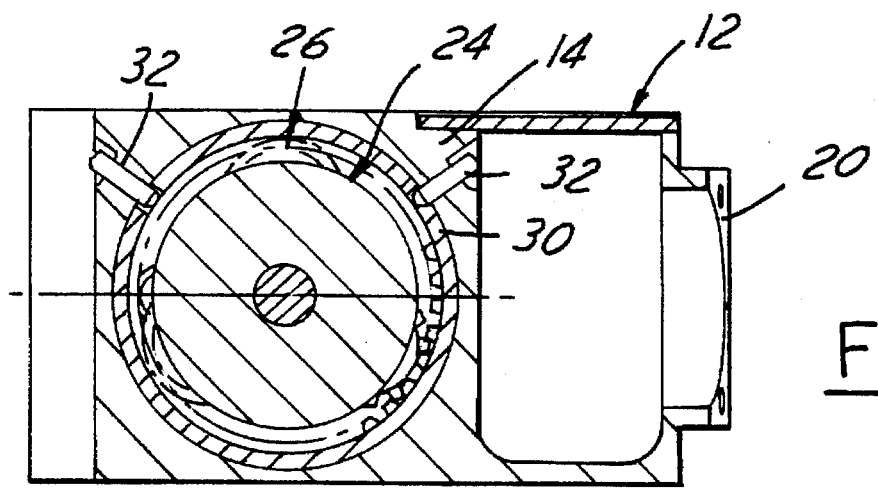
Figure 10:
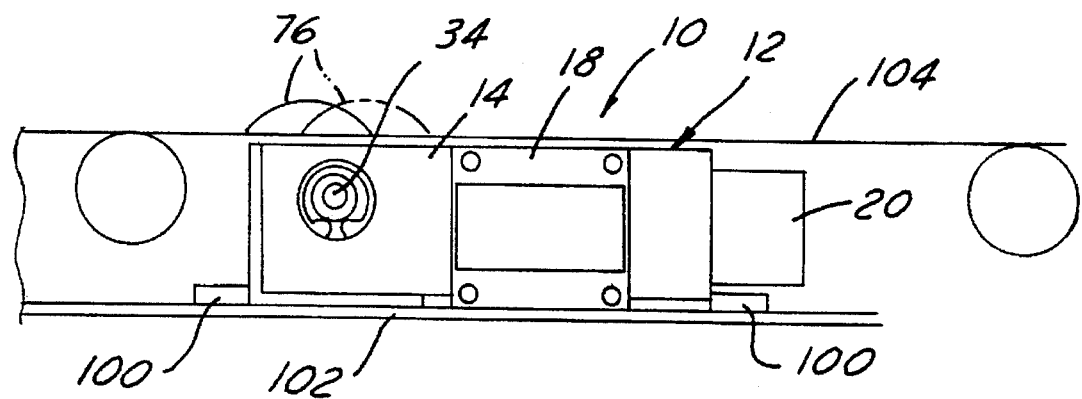
FIG. 10 is an elevational schematic view that illustrates the power drive unit in relation to the cargo roller conveyor.

The drawings illustrate a self-erecting power drive unit 10 in accordance with a presently preferred embodiment of the invention as comprising a housing 12 having a frame 14 and a sideplate 16. A bi-directional electric motor 18 is carried by frame 14 within housing 12, and has leads (not shown) fed to a connector 20 at one end of housing 12 for connection to external control circuitry. Motor 18 has an output shaft 22 (FIG. 5) that is coupled by first and second sets of planetary gears 24, 26 to an output gear 28 that is coaxial with motor output shaft 22. Planetary gear sets 24, 26 are rotatably supported by a bearing sleeve 30 that is held by pins 32 (FIG. 7) against rotation within housing frame 14. Frame 14 has flanges 100 for mounting unit 10 to support structure 102 (FIG. 10) so that the unit may engage cargo on an overlying ball or roller conveyor 104.

A roller drive shaft 34 (FIGS. 2–5 and 9) is carried by bearings 36, 38 (FIG. 5) in fixed position relative to housing frame 14 for rotation about an axis parallel to and laterally spaced from the axis of rotation of motor output shaft 22 and planetary output gear 28. Roller drive shaft 34 is operatively coupled to planetary output gear 28 by a pair of idler gears 40, 42, which are respectively rotatably mounted on associated pins 44, 46 by associated sets of beatings 48, 50. Thus, there is a direct connection between motor output shaft 22 and roller drive shaft 34 through the gear transmission formed by planetary gear sets 24, 26 with output gear 28, and series-connected idler gears 42, 40.

Figure 1:
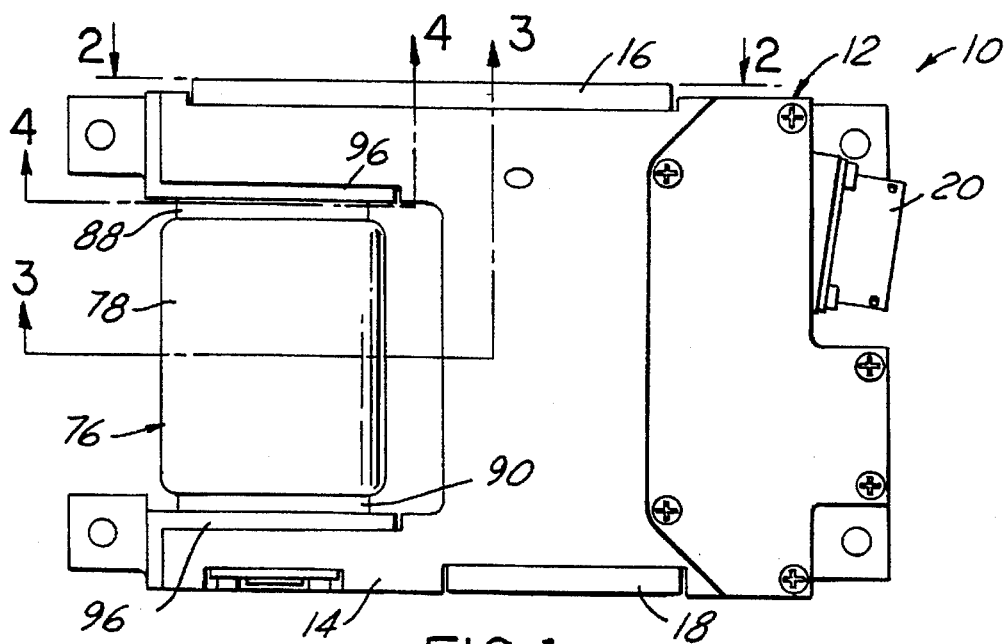
FIG. 1 is a top plan view of a self-erecting power drive unit in accordance with a presently preferred embodiment of the invention.
Figure 2:
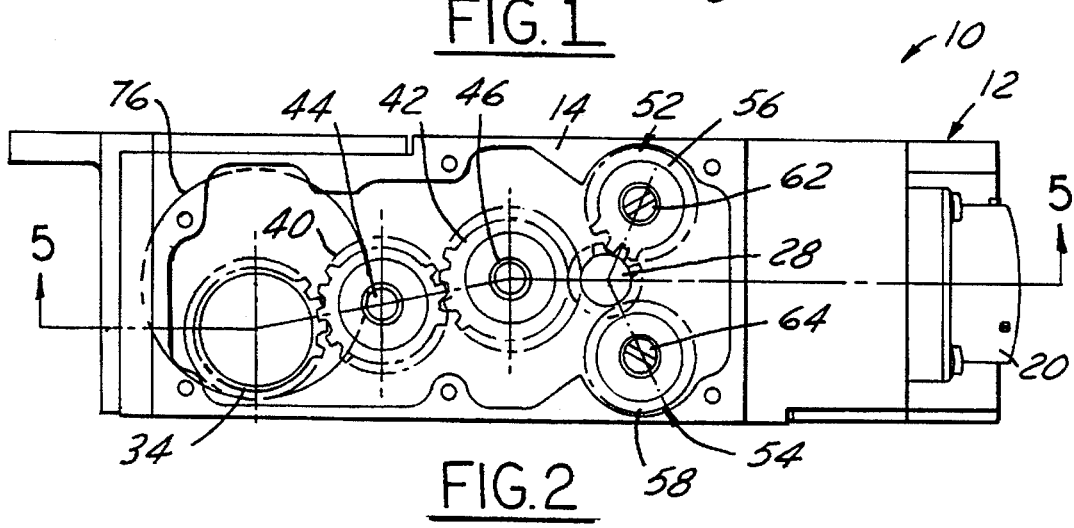
FIG. 2 is a side elevational view of the power drive unit illustrated in FIG. 1 with side plate removed, being taken substantially along the line 2—2 in FIG. 1.
Figure 6:
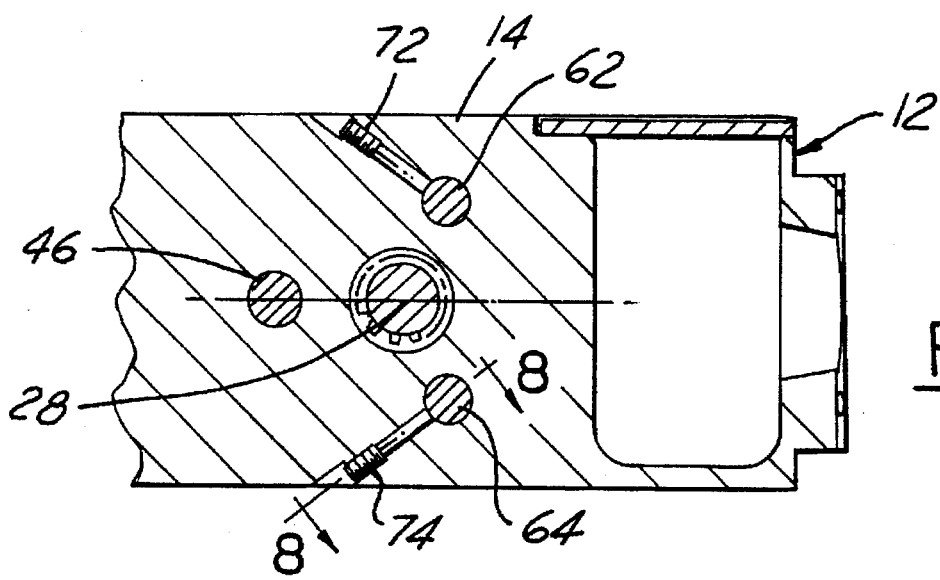
FIGS. 6 and 7 are fragmentary sectional views taken along the respective lines 6—6 and 7—7 in FIG. 5.
Figure 8:
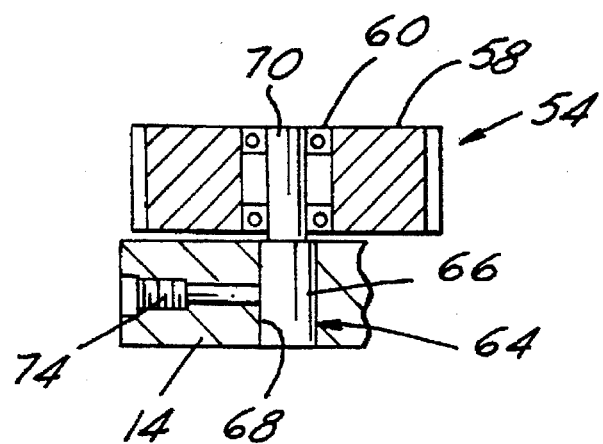
FIG. 8 is a fragmentary sectional view taken substantially along the line 8—8 in FIG. 6.

A pair of reaction gear mechanisms 52, 54 (FIG. 2) are mounted on frame 14 beneath sideplate 16 in engagement with planetary output gear 28 for supporting the planetary output gear against the reaction forces imparted thereto by roller drive shaft 34 through idler gears 40, 42. Each reaction gear mechanism 52, 54 comprises an associated idler gear 56, 58 supported by associated bearings 60 (FIG. 5) on an associated shaft 62, 64 (FIGS. 2, 6 and 8). In the illustrated embodiment, each shaft 62, 64 is an adjustable eccentric shaft illustrated in FIG. 8 as comprising a cylindrical base 66 rotatably mounted in an associated opening 68 within frame 14, and an extension 70 projecting therefrom for supporting bearing 60 and gear 58. The axis of extension 70 is eccentric to the axis of base 66. Shaft 62 is identical to shaft 64. Each adjustable eccentric shaft 62, 64 has a screwdriver slot (FIG. 2) at the end of extension 70 for facilitating operator adjustment of the axis of rotation of associated gear 56, 58, and is clamped in adjusted position within frame 14 by an associated set screw 72, 74 (FIGS. 6 and 8). Thus, the axis of rotation of each reaction gear mechanism 52, 54 is selectively adjustable at the time of assembly for optimum engagement with planetary output gear 28. It will also be noted that reaction gear mechanisms 52, 54 are angularly spaced from each other and from idler gear 42. By eliminating any need for bearing support of output gear 28, the overall drive unit package is made more compact, while output gear 28 is essentially free-floating and self-aligning in operation.

Figure 3:
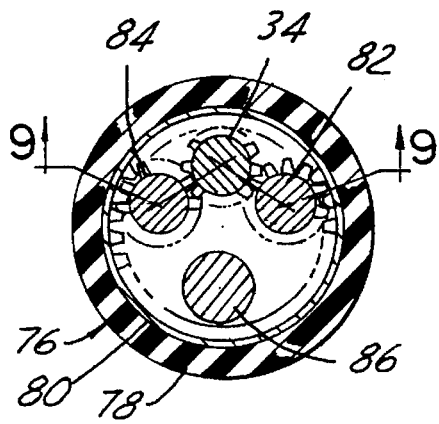
FIGS. 3 and 4 are respective fragmentary sectional views taken substantially along the lines 3—3 and 4—4 in FIG. 1.
Figure 4:
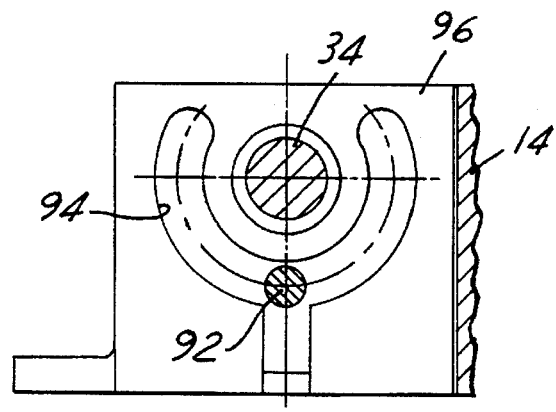
Figure 9:
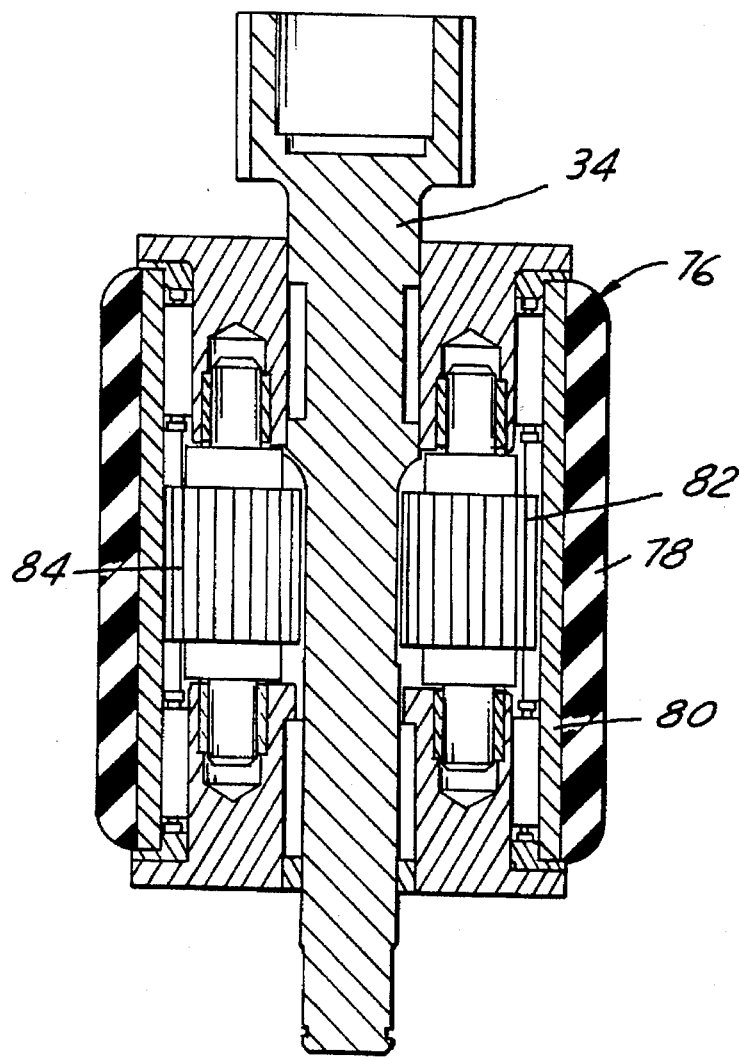
FIG. 9 is a sectional view taken substantially along the line 9—9 in FIG. 3.

Drive unit 10 has a drive roller 76 that includes a resilient tread 78 of rubber or the like surrounding an internally geared roller sleeve 80 (FIGS. 2–3 and 9). Roller 76 eccentrically surrounds roller drive shaft 34, and internal teeth on sleeve 80 are rotatably coupled to external teeth on drive shaft 34 by means of a pair of drive gears 82, 84 (FIGS. 3 and 9). A pin 86 (FIG. 5) extends within roller 76 between roller end members 88, 90, and has ends 92 that axially project from roller 76 into arcuate slots 94 in axially opposed plates 96 carried by housing frame 14. Pin ends 92 act as locators within slots 94 for guiding and restraining motion of pin 86 and roller 76, in reaction to initial energization of motor 18 in either direction, for moving roller 76 from the fully lowered or retracted position (FIGS. 2–4) to the fully raised position (FIGS. 5 and 10) in either the forward or reverse direction of motor rotation. That is, from the fully retracted position illustrated in FIG. 4, rotation of motor 18 in one direction moves locator pin ends 92 and roller 76 clockwise within slots 94 around the axis of shaft 34, while rotation of motor 18 in the other direction moves locator ends 92 counterclockwise within slots 94 around the axis of roller drive shaft 34.

We claim:

1. A power drive unit for aircraft cargo handling system applications that comprises a support frame, a motor carried by said frame and having a motor output shaft, a drive roller on a roller drive shaft carried by said frame for engagement with cargo to be driven by said unit, planetary gear means within said frame having an input coupled to said motor output shaft and an output gear coaxial with said motor output shaft, drive gear means operatively coupling said output gear to said roller drive shaft, and means supporting said output gear with respect to said frame, the improvement wherein said support end means comprises bearingless means for supporting said output gear with respect to said frame including at least one idler gear freely rotatably mounted on said frame and in meshing engagement with said output gear in opposition to said drive gear means.

2. The unit set forth in claim 1 wherein said bearingless means comprises a pair of said idler gears angularly spaced from each other and from said drive gear means in meshing engagement with said output gear.

3. A power drive unit for aircraft cargo handling systems that comprises:

a motor having a motor output shaft, a drive roller mounted on a roller drive shaft for engagement with cargo to be driven by said unit, first gear means having an output gear and means for rotatably coupling said motor output shaft to said output gear, second gear means for rotatably coupling said output gear to said roller drive shaft, and means for rotatably supporting said output gear against reaction forces imparted thereto by said second gear means comprising reaction gear means operatively coupled to said output gear in opposition to said second gear means, said reaction gear means comprising at least one idler gear engaged with said output gear and mounted on a reaction gear shaft for rotation about an axis parallel to said output gear, and means coupled to said reaction gear shaft for adjusting position of said axis relative to said output gear.

4. The unit set forth in claim 3 further comprising a unit housing, said reaction gear shaft having a base supported within said housing for rotation eccentric to said axis, and said unit further including means for clamping said base in position within said housing.

5. The unit set forth in claim 4 wherein said clamping means comprises a set screw threadably received in said housing.

6. The unit set forth in claim 5 wherein said eccentric gear shaft further includes a screwdriver slot at one end thereof for facilitating adjustment of said axis with respect to said output gear.

7. The unit set forth in claim 3 wherein said reaction gear means comprises a pair of said idler gears engaged with said output gear, and angularly spaced from each other and from said second gear means around said output gear.

8. A power drive unit for aircraft cargo handling systems that comprises:

a motor having a motor output shaft, a drive roller mounted on a roller drive shaft for engagement with cargo to be driven by said unit, first gear means having an output gear and means for rotatably coupling said motor output shaft to said output gear, second gear means for rotatably coupling said output gear to said roller drive shaft, and means for rotatably supporting said output gear against reaction forces imparted thereto by said second gear means comprising reaction gear means operatively coupled to said output gear in opposition to said second gear means, said reaction gear means comprising a pair of idler gears engaged with said output gear and mounted on respective reaction gear shafts for rotation about respective axes parallel to said output gear, said pair of reaction gears being angularly spaced from each other and from said second gear means around said output gear.

9. The unit set forth in claim 8 further comprising means coupled to each said reaction gear shaft for adjusting position of said axis relative to said output gear.

10. The unit set forth in claim 8 wherein said output gear is coaxial with said motor output shaft, and wherein said first gear means comprises planetary gear means for coupling said motor output shaft to said output gear.

11. The unit set forth in claim 8 wherein said roller drive shaft is parallel to said motor output shaft, and wherein said unit further comprises means for erecting said roller from a lowered position to a raised position for engaging cargo.

12. The unit set forth in claim 11 further comprising a housing in which said motor, said drive roller, said drive shaft, said first and second gear means, and said reaction gear means are mounted, said erecting means being constructed and arranged to erect said roller without moving said housing.

13. A power drive unit for aircraft cargo handling systems that comprises:

a motor having a motor output shaft, a drive roller mounted on a roller drive shaft parallel to said motor output shaft for engagement with cargo to be driven by said unit, first gear means having an output gear and means for rotatably coupling said motor output shaft to said output gear, second gear means for rotatably coupling said output gear to said roller drive shaft, means for rotatably supporting said output gear against reaction forces imparted thereto by said second gear means comprising reaction gear means operatively coupled to said output gear in opposition to said second gear means, means for erecting said roller from a lowered position to a raised position for engaging cargo, and a housing in which said motor, said drive roller, said drive shaft, said first and second gear means, and said reaction gear means are mounted, said erecting means being constructed and arranged to erect said roller without moving said housing.

14. The unit set forth in claim 13 wherein said roller includes a hollow sleeve with internal gear teeth, said roller drive shaft being disposed within said sleeve eccentric to said sleeve and having external gear teeth, said erecting means comprising third gear means rotatably coupling said sleeve to orbit around said roller drive shaft.

15. The unit set forth in claim 14 wherein said erecting means further comprises locating means eccentrically projecting from said sleeve, and means providing an arcuate slot in which said locating means is received for guiding said roller between said lowered and raised positions.

16. The unit set forth in claim 15 wherein said unit comprises a bi-directional motor, and wherein said slot receives and guides said locating means during erection of said roller responsive to both forward and reverse rotation of said motor and said roller.

17. The unit set forth in claim 16 wherein said motor comprises an electric motor.

* * * * *